(12) United States Patent
Khan et al.

(10) Patent No.: US 6,345,094 B1
(45) Date of Patent: Feb. 5, 2002

(54) INBOUND/OUTBOUND CALL RECORD PROCESSING SYSTEM AND METHOD

(75) Inventors: Saima Khan, Chelmsford; Wenyao Xu, Lowell, both of MA (US)

(73) Assignee: Davox Corporation, Westford, MA (US)

( * ) Notice: Subject to any disclaimer, the term of this patent is extended or adjusted under 35 U.S.C. 154(b) by 0 days.

(21) Appl. No.: 09/093,264

(22) Filed: Jun. 8, 1998

(51) Int. Cl.[7] .............................. H04M 3/00; H04M 5/00
(52) U.S. Cl. ............................. 379/266.07; 379/266.1; 379/309
(58) Field of Search .............................. 379/38, 45, 68, 379/69, 87, 88.03, 88.11, 88.16, 88.19, 88.2, 88.21–88.25, 92.01–92.03, 93.12, 93.13, 102.01, 106.01, 106.02, 309, 201.01, 201.02, 201.05, 216.01, 265.01, 265.02, 266.01, 266.02, 266.07, 266.1; 707/1–3, 6

(56) References Cited

U.S. PATENT DOCUMENTS

| | | | | |
|---|---|---|---|---|
| 4,961,139 A | * | 10/1990 | Hong et al. ...................... 701/1 |
| 5,343,518 A | * | 8/1994 | Kneipp ......................... 379/355 |
| 5,586,179 A | | 12/1996 | Stent et al. | |
| 5,592,543 A | | 1/1997 | Smith et al. | |
| 5,787,151 A | * | 7/1998 | Nakatsu et al. .......... 379/88.23 |
| 5,898,770 A | * | 4/1999 | Valentine .................... 379/249 |
| 5,926,526 A | * | 7/1999 | Rapaport et al. ......... 379/88.25 |
| 6,074,616 A | * | 6/2000 | Buechler et al. ............ 422/104 |
| 6,141,412 A | * | 10/2000 | Smith et al. ................. 379/265 |

* cited by examiner

Primary Examiner—Fan Tsang
Assistant Examiner—Roland G. Foster
(74) Attorney, Agent, or Firm—Bourque & Associates, PA (57) ABSTRACT

An inbound/outbound call record processing system and method processes outbound call records for use with inbound telephone calls. The call record processing system includes a call record finder that finds outbound call records that match an inbound telephone call, for example, by searching a call record index table including a plurality of indexed call records corresponding to a plurality of outbound call records in one or more outbound call lists. One way of finding matching outbound call records is by receiving and automatically identifying a telephone number associated with the inbound telephone call and searching for an indexed call record having a searchable key field that matches the telephone number. If no records are found by searching for the telephone number, a search can be made based upon requested information provided by the calling party. When a matching outbound call record is used for an inbound telephone call, the call record is listed in an exclusion list, excluding the matching call record from being called and processed as an outbound telephone call. The call record processing system also includes a call record updater that stores updated call records and new call records generated as a result of inbound telephone calls in a call record update table, which is also searchable by the call record finder. The outbound call lists can then be updated based upon the call records in the call record update table.

26 Claims, 4 Drawing Sheets

INBOUND/OUTBOUND CALL RECORD PROCESSING SYSTEM AND METHOD

FIELD OF THE INVENTION

The present invention relates to telephone call record processing in telephone call centers, and more particularly, to a system and method for processing call records for use with both inbound telephone and outbound telephone calls in a telephone call center.

BACKGROUND OF THE INVENTION

Many businesses and customer service organizations utilize a telephone call center to place outbound telephone calls and receive inbound telephone calls to and from customers or potential customers, for example, for credit collection or telemarketing. Computer telephony integration (CTI) has allowed telephone call centers to more efficiently handle both outbound telephone calls and inbound telephone calls. These computerized telephony systems typically include an automated dialer that automatically places outbound telephone calls, an automatic call distributor (ACD) that handles large volumes of inbound telephone calls, and a telephone call center management system that controls these and other components of the telephony system. One example of a system and method for integrating outbound and inbound telephone calls is disclosed in greater detail in U.S. Pat. No. 5,586,179 issued Dec. 17, 1996, assigned to the assignee of the present invention and incorporated herein by reference.

Telephone call centers also include a number of audio head sets and data terminals used by agents or operators to communicate with the called parties and calling parties. Using the data terminal, such as a PC, the agents can view and/or enter call record data pertaining to the party (e.g., the customer or potential customer) and the transaction being made. The telephone call center management system typically controls the allocation of the agents to the inbound and/or outbound telephone calls and the management of the data presented to the agents and entered by the agents. The processing of a series of telephone calls (inbound or outbound) in a telephone call center is often referred to as a call campaign.

To initiate an outbound call campaign, the telephone call center management system generates a predefined, sorted customer call list having a number of customer call records (CCRs) including, for example, a telephone number to be called, a name, address, account number, and other information pertaining to the customer and the transaction. The call records pertaining to an outbound call campaign are typically downloaded from a call record source, such as a host computer, and are organized, e.g., according to the calling time, into the call lists. The telephony system reads a call record from the predefined call lists, displays the information from that call record on a display at a terminal of an available agent, and dials the telephone number, either automatically or at the request of the agent. The system monitors the call and if an answer is detected, the called party is connected to the agent. The agent can then enter additional information and the call record in the call list will be updated accordingly upon completion of the outbound telephone call.

Outbound telephone calls are typically grouped according to a particular application. One example of an outbound telephone call campaign is in the field of telemarketing where the agents or telemarketing service representatives (TSRs) market products and/or services to the called party and take orders for the products and/or services. In this example, the telephone calls may be grouped according to the type of product or service that is being marketed.

Typically, for every outbound call application there is also an inbound call application. Customers or potential customers that have been called or are scheduled to be called in the outbound call campaign often place an inbound telephone call pertaining to that application. For example, a customer may be calling regarding an order placed during an outbound call made earlier in the day, or a potential customer may be calling back to place an order.

For an inbound telephone call campaign, the ACD or other similar device receives the inbound telephone calls and distributes the inbound telephone calls to the appropriate available agent. Typically, the call center management system determines the appropriate agent(s) and allocates the agent accordingly. Upon requesting information from the calling party, such as a name, address, telephone number, or account number, the agent can obtain additional information pertaining to the calling party, if any exists, from the host computer. Alternatively, a Voice Response Unit (VRU) can be used to request the information from the calling party and automatically transfer any additional information from the host computer to the agent. Such a system is described in greater detail in U.S. Pat. No. 5,164,981 issued Nov. 17, 1992, assigned to the assignee of the present invention and incorporated herein by reference.

Although the inbound and outbound calls can be integrated in a single telephone call center, the existing call center management systems process call records for inbound telephone calls independently of the call records used for outbound telephone call campaigns. The existing telephony call systems retrieve call records from the host for use with inbound calls and do not have the ability to access the up-to-date call records organized in the outbound call list. The existing systems also do not update the call records in the outbound call list as a result of the changes made during inbound telephone calls.

Thus, the agents may be unaware of a recent transaction with a customer made during an outbound call when that customer places an inbound call, or vice versa. As a result, customers or potential customers may be inconvenienced when asked to provide information that was previously provided during an outbound telephone call to that customer or potential customer. Also, customers or potential customers may be unnecessarily called during an outbound call campaign after the customer or potential customer has previously placed an inbound telephone call. Overall, existing telephony call systems do not efficiently process call records used for both inbound and outbound telephone call campaigns.

Accordingly, a need exists for a system and method for processing inbound and outbound telephone calls that allows call records in an outbound call list to be accessed and used for inbound telephone calls. A need also exists for an inbound/outbound call record processing system and method that efficiently and automatically retrieves the desired call record in the outbound call list and provides the call record to an available agent to minimize the time that the calling party must wait. Furthermore, a need exists for an inbound/outbound call record processing system and method that updates the call records in an outbound call list with any changes that have been made as a result of inbound telephone calls.

SUMMARY OF THE INVENTION

The present invention features an inbound/outbound call record processing system, for processing call records for use with both inbound telephone calls and outbound telephone calls in a telephone call center. The inbound/outbound call record processing system comprises at least one outbound call list including a plurality of call records each having a record identifier and a plurality of data fields. The system also comprises a call record index table including a plurality of indexed call records corresponding to the call records in the outbound call list. Each of the indexed call records includes a record identifier corresponding to the record identifier of one of the call records in the outbound call list and includes one or more searchable key fields. The system further comprises a call record finder, responsive to at least one inbound telephone call from a calling party, for receiving identification data associated with the calling party, for searching at least the call record index table for key field data matching the identification data, for obtaining a record identifier of a matching call record having the matching key field data, and for retrieving the matching call record from the outbound call list.

The identification data can include an automatically identified telephone number of the calling party or requested information provided by the calling party, such as a name, zip code, or account number.

The system further comprises an exclusion list, for listing call records to be excluded from outbound telephone calls. Matching call records found by the call record finder to be used for inbound telephone calls are placed in the exclusion list.

The system further comprises at least one call record update table including a plurality of updated call records that have been updated as a result of inbound telephone calls. A call record updater is responsive to a completion of the inbound telephone call, for inserting an updated call record into the call record update table. The call record update table is searchable by the call record finder.

The system also preferably includes a call list updater, for updating the outbound call list with the updated records in the call record update table. The system also preferably includes a call record index table creator/updater, for creating the call record index table based on the one or more outbound call lists and for updating the call record index table based on changes to the one or more outbound call lists.

The present invention also features a method for processing call records for use with both inbound telephone calls and outbound telephone calls in a telephone call center. The method comprises the steps of: providing one or more outbound call lists including call records used to make outbound telephone calls, wherein each call record includes a call record identifier and a plurality of data fields; receiving at least one inbound telephone call from a calling party and identification data associated with the calling party; finding at least one matching call record having the identification data of the calling party in the outbound call list; placing the matching call record into an exclusion list of excluded call records, for excluding the matching call record from being used for outbound telephone calls; transferring the matching call record to a agent terminal assigned to the inbound telephone call, for processing said inbound telephone call and updating said matching call record to generate an updated call record; and inserting the updated call record into a call record update table.

The method of finding the matching call record preferably includes first searching the call record update table for an updated call record having the identification data. If the matching call record is not found in the call record update table, the step of finding the matching call record includes searching a call record index table for an indexed call record having the key field data that matches the identification data, wherein the indexed call record having the key field data that matches the identification data includes a record identifier corresponding to the record identifier of one of the call records in the outbound call list; and retrieving the matching call record having the corresponding record identifier found in the call record index table from the outbound call list.

The method preferably includes first searching the updated call record table and/or the indexed call record table using an automatically identified telephone number of the calling party and then using requested information provided by the calling party, if a matching record with the telephone number is not found. The preferred method further includes the steps of creating a new call record when a matching call record is not found; and inserting the new call record in the call record update table.

The preferred method further includes the steps of: updating the outbound call list with the updated call records in the call record update table; deleting the excluded call records from the exclusion list; and assigning new call records in the call record update table to a new call record table.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

The inbound/outbound call record processing system 10, FIG. 1, according to the present invention, processes call records for both inbound telephone calls and outbound telephone calls in a telephone call center 12 by accessing outbound call records for use with inbound telephone calls and by updating outbound call records as a result of inbound calls, as will be described in greater detail below. In the exemplary embodiment, the inbound/outbound call record processing system 10 is implemented as part of a telephone call center management system 14, such as the type sold under the name UNISON® by Davox Corporation of Westford, Mass. This type of a system is described in greater detail in U.S. Pat. No. 5,592,543 issued Jan. 7, 1997, assigned to the assignee of the present application and incorporated herein by reference. The present invention also contemplates using the system and method of the present invention with other types of call center management systems used to control inbound and outbound telephone calls in a telephone call center, as is known in the art.

The telephone call center 12 typically includes an inbound call handler 16, such as an Automatic Call Distributer (ACD), for handling the inbound telephone calls, and a dialer 18, such as a predictive dialer, for placing the outbound telephone calls over one or more telephone trunk lines 20, as is well known in the art. The present invention contemplates an inbound call handler 16 and dialer 18 provided as separate units or as a single unit capable of receiving inbound telephone calls and placing outbound telephone calls. A host computer 22 stores information pertaining to the outbound and inbound telephone calls, such telephone numbers, names, addresses, account numbers, transaction information, and other customer or potential customer information. A plurality of headsets 24 or other type of audio transmitting devices connect an available agent to the inbound or outbound call over one of the telephone lines 20, for conversing with the calling or called party. A plurality of data terminals 26 receive and display information pertaining to the inbound and outbound telephone calls and allow input of additional data as a result of the telephone calls.

The present invention also contemplates other components commonly used in telephone call centers, such as a Voice Response Unit (VRU) that provides a recorded message to a party and requests information to be entered by the party, e.g., using a touch tone telephone. The call center management system 14 manages and controls the operation of the inbound call handler 16, the dialer 18, the agent terminals 26, the host 22, as well as other components of the telephone call center 12.

In general, the call record processing system 10 includes a call record finder 30 and a call record updater 36. The call record finder 30, in response to an inbound telephone call, searches a call record index table 32 having a plurality of indexed call records corresponding to call records in one or more outbound call lists 34. The call record finder 30 searches the call record index table 32 for matching call records in the outbound call lists 34 that can be used for the inbound telephone call. The call record updater 36, in response to the completion of an inbound telephone call, records the changes made to the outbound call records as a result of the inbound telephone call, using one or more call record update tables 38 created for the particular application. The call record update table(s) 38 is searchable by the call record finder 30 to find matching call records that may have been recently updated or added as a result of a previous inbound call and is used to update the outbound call lists 34 with any changes made during inbound telephone calls.

Figure 2:
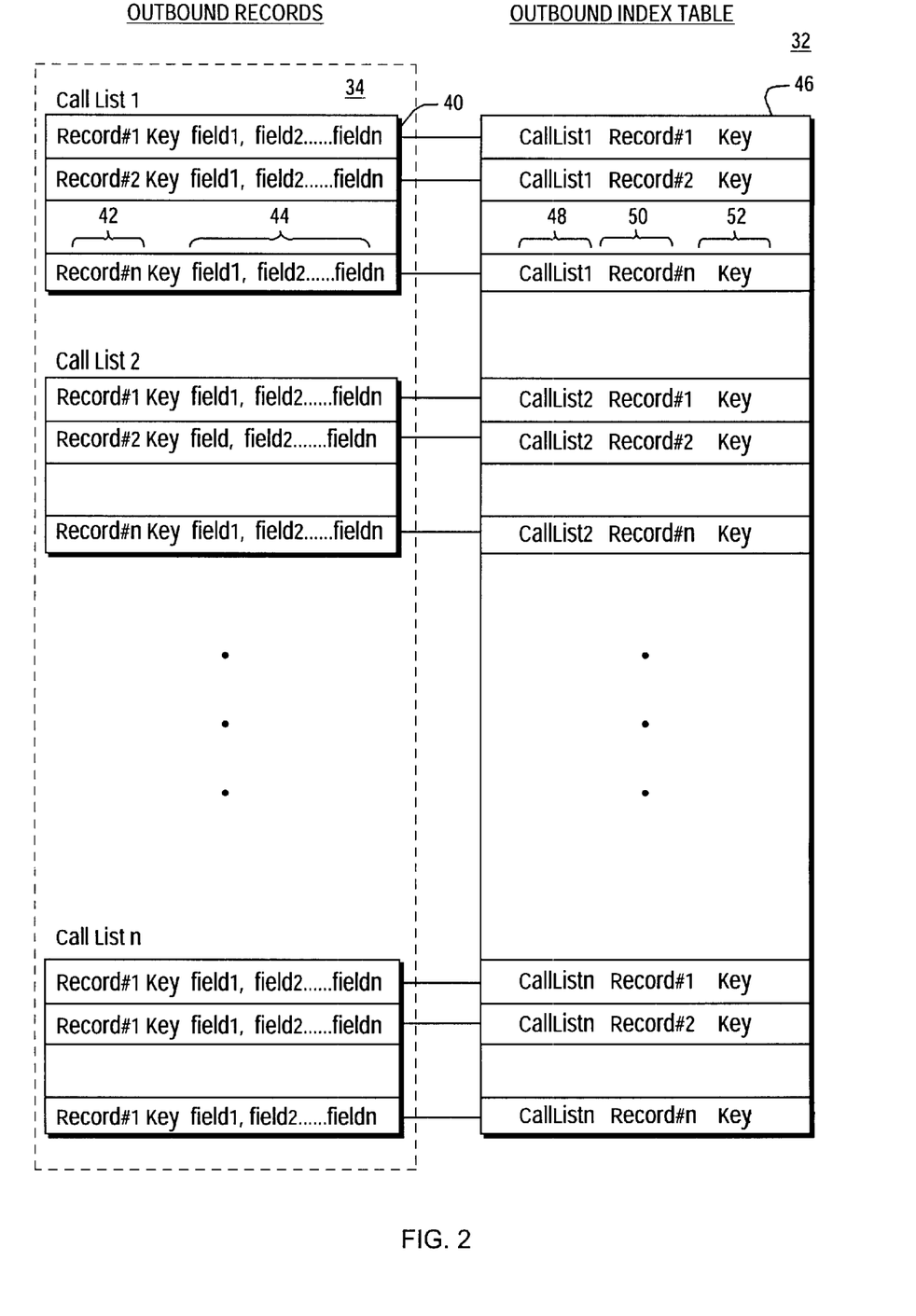
FIG. 2 is a schematic illustration of outbound call lists and an outbound call record index table created from the outbound call lists, according to the present invention.

Each of the call lists 34, FIG. 2, preferably has a name (e.g., CallList 1, CallList 2, . . . CallList n) and includes a plurality of call records 40. Each of the call records 40 in the call lists 34 include a record identifier 42 (e.g., Record#1, Record#2, . . . Record#n) and a plurality of fields 44 including information pertaining to the party to be called, such as a name, address, account number, order number, or other customer or potential customer information and transaction information. The call lists 34 are preferably organized and grouped according to a particular application, such as a telemarketing application or credit collections application, and are often referred to as customer call records (CCRs). The call records for a particular application are downloaded from the host 22 to the call center management system 14 where the call records are organized and sorted into the outbound call lists 34 to be processed as an outbound call campaign.

For each application, an outbound call record index table 32 is created that corresponds to the group of call lists 34 for that particular application. The call record index table 32 includes a plurality of indexed call records 46 having a call list identifier 48, record identifier 50, and one or more searchable key fields 52 used to locate the matching call record in the outbound call lists 34. The key fields 52 include searchable data pertaining to the call record, such as a telephone number, name, zip code, account number, order number or any other type of searchable data. In each of the indexed call records 46, the call list identifier 48 corresponds to one of the grouped call lists 34 and the record identifier 50 corresponds to a record identifier 42 of one of the call records in the call lists 34. Accordingly, there is a one-to-one relationship between the call records 40 in the outbound call lists 34 and the indexed call records 46 in the call record index table 32 that corresponds to that particular outbound call application. The call record index table allows matching records to be found quickly and efficiently.

Figure 1:
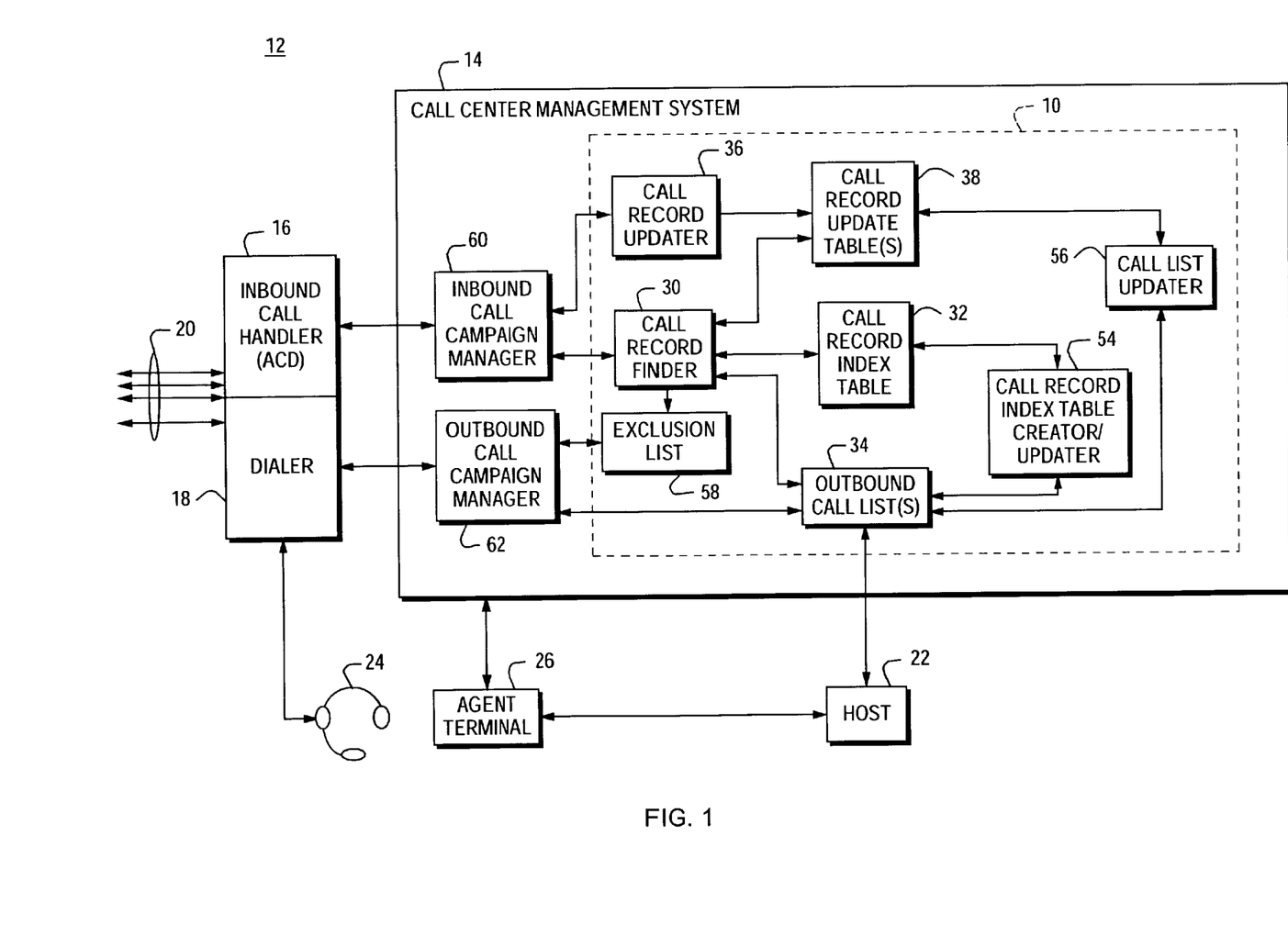
FIG. 1 is a schematic block diagram of an inbound/outbound call record processing system used in a telephone call center, according to one embodiment of the present invention.

The call record processing system 10, FIG. 1, preferably includes a call record index table creator/updater 54 that creates the call record index table 32 and periodically rewrites the call record index table 32 based on the outbound call lists 34 available on the system. The call record index table creator/updater 54 also updates the call record index table 32 as a result of changes in one of the call lists 34, for example, by deleting call records, inserting call records, and/or renaming call records.

In one embodiment, the call record update tables 38 include two ancillary stub tables for recording the changes made to the outbound call records during inbound telephone calls. One of the tables is a record storing table specific to each application and has a structure substantially identical to a call record list 34 for the particular application with two additional fields, namely, a call list name field and a time stamp. The application specific record storing table generally includes a row as a result of each inbound telephone call. The other table is an update tracking table generic to all call campaigns and identifies each record storing table to which updated and/or new records have been added and identifies the corresponding call list. Whenever an updated call record is added to one of the call record storing tables, a row is added to the update tracking table.

A call list updater 56 updates the outbound call lists 34 with the updated and new call records recorded by the call record update tables 38. For example, when the outbound call campaigns are finished for the day, the call list updater 56 goes through the update tracking table to determine each of the record storing tables that have been worked on for that day and updates the appropriate call lists 34 with the updated and/or new call records in the record storing table accordingly.

The call record processing system 10 further includes an exclusion list 58, for excluding call records from being called and processed in the outbound telephone call campaign. The outbound call records found by the call record finder 30 for use with an inbound telephone call are listed in the exclusion list 58 so that a redundant outbound telephone call for that record will not be made after the inbound telephone call is processed using that call record.

In the preferred embodiment, the call center management system includes an outbound call campaign manager 60 that obtains a call record from the outbound call lists 34 and initiates outbound dialing of the telephone number included in the call record using the dialer 18. The outbound call campaign manager 60 is responsive to the exclusion list 58 and will not initiate dialing of a telephone number if that call record is listed in the exclusion list. When an outbound call is answered and the called party is connected to the headset 24 of an available agent, information pertaining to the called party in the call record from the outbound call lists 34 is transmitted to the terminal 26 of the agent so that the agent can view the information, modify the information, and/or add new information to the call record while conversing with the called party. An outbound call campaign typically continues until all of the call records in the call list 34 associated with that campaign have been dialed.

In the preferred embodiment, the call center management system 14 also includes an inbound call campaign manager 62 that initiates the searching for matching call records using the call record finder 30 and initiates the recording of updated and new call records using the call record updater 36 and the call record update table(s) 38. An inbound call campaign typically exists when parties, such as customers or potential customers, on the outbound call list place inbound telephone calls. For example, the party may be calling back in response to a previous outbound call to that party, or the party may be calling before that party's call record has been selected from the outbound call list 34 for dialing. When an inbound telephone call is received and a calling party is connected to the headset 24 of an available agent, the matching call record from the outbound call lists 34 (if found) is automatically transmitted to the terminal 26 of the agent.

The call record finder 30, call record updater 36, call record index table creator/updater 54, and call list updater 56 are preferably implemented as software in the form of one or more scripts that run on one or more computers in the telephone call center 12, e.g., the PCs used as the agent terminals 26, the host computer 22, or any other computer used as part of the call center management system 14.

In one embodiment, the call record finder 30 is implemented as one or more scripts that are invoked by the inbound call campaign manager 60 to search for the matching call records based on identification data pertaining to the calling party. For example, a "lookup" script is invoked as a result of an inbound call and a "save" script is invoked when an agent terminates an inbound call. The call record finder 30 preferably includes at least a first searching or "lookup" script that searches for a matching call record based on an automatically identified telephone number obtained, for example, with Automatic Number Identification (ANI). The call record finder 30 can include a secondary searching script that searches for a matching call record using requested information provided by the calling party, such as a zip code, name, account number, order number or any other data present in a searchable key field 52 (FIG. 2) in the call record index table 32. If either searching script finds the identification data (i.e., the automatically identified telephone number or requested information) in the key field 52 of one of the indexed call records 46 in the call record index table 32, the matching call record data is retrieved from the outbound call lists 34 based upon the call record identifier. The matching call record is preferably returned as a text string including the call list name, record number, a time stamp, and the fields containing the call record data. If no matching record is found, only a time stamp is returned and a new call record is generated, as described in greater detail below.

In the exemplary embodiment, the call record updater 36 is also implemented in the form of a script that is invoked by the inbound call campaign manager 60 to record updated call records in the call record update tables 38. The script inserts a row in the appropriate record storing table for the particular application by sending the call list name, record number, time stamp, the field name(s) to be updated, and the text to be added to the updated field. The insert script also inserts a row in the update tracking table with the name of the record storing table for the particular application and the name of the corresponding outbound call list 34.

Figure 3:
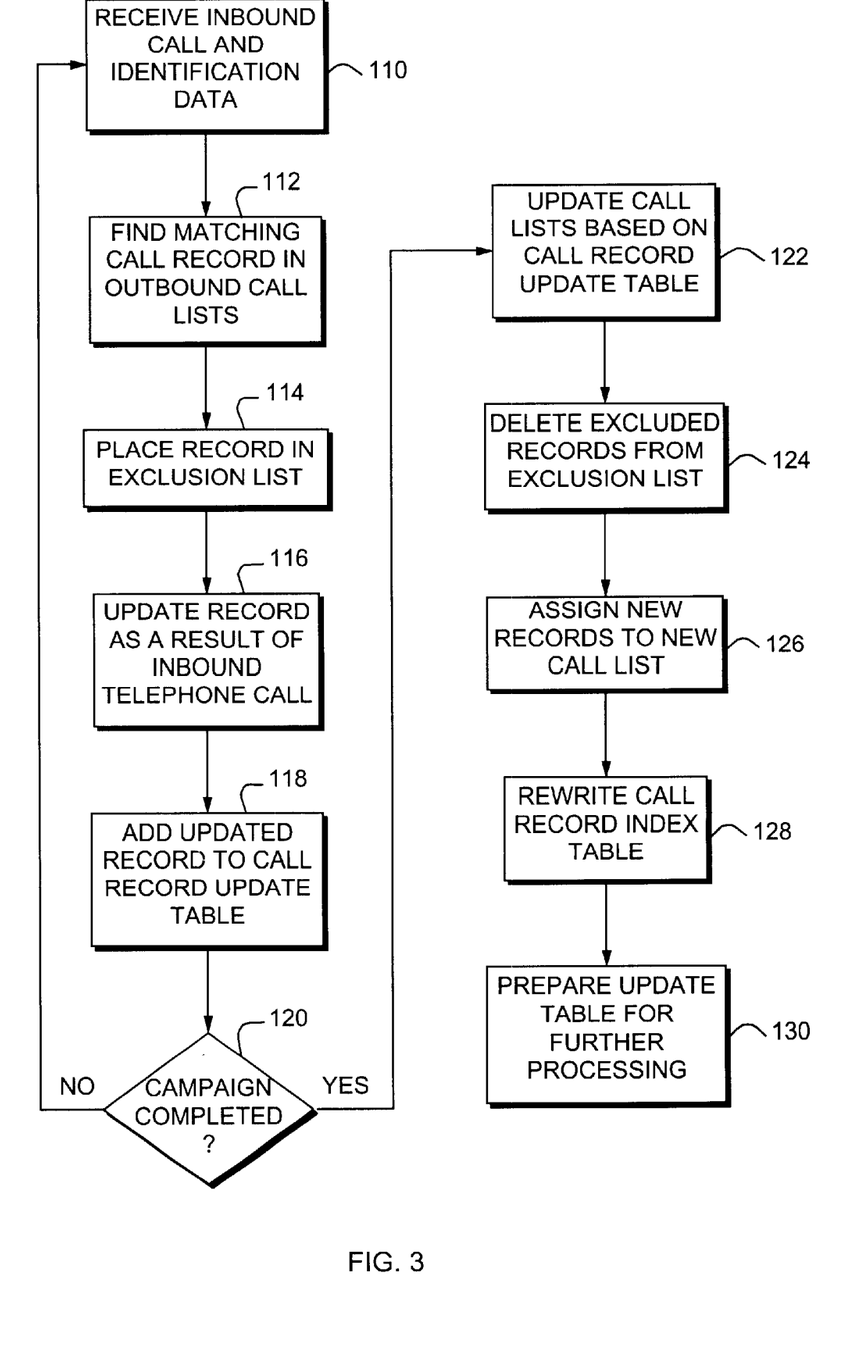
FIG. 3 is a flow chart illustrating a method of processing outbound call records for use with inbound telephone calls, according to the present invention.

Referring to FIG. 3, the method of processing inbound telephone calls with call records in the outbound call lists, according to the present invention, begins by receiving an inbound telephone call, step 110. In response to the inbound telephone call, the call record finder 30 looks up the matching call record, step 112, by searching the call record update table(s) 38 and/or the call record index table 32. When the matching record is found, the record is placed in the exclusion list 58, step 114, so that the matching record will not be called during the outbound telephone call campaign. The agent uses the matching call record to process the inbound telephone call and makes any necessary updates to the call record, step 116, as a result of the inbound telephone call. The updated call record is then added to the appropriate call record update table 38, step 118.

According to one method, the processing of inbound telephone calls using outbound call records continues until the outbound call campaign is completed, step 120. Upon completion of the call campaign, the appropriate call lists 34 are updated based on the updated call records in the call record update table(s) 38, step 122. The excluded call records are deleted or cleared from the exclusion list 58, step 124. Any new call records generated by the agent and stored in the call record update table(s) 38 are assigned to an appropriate new call list, step 126. Further, the call record index table 32 is updated, step 128, for example, by re-writing the index table 32 to list indexed call records having modified or new key fields, and the call record update table 40 is truncated and prepared for further call record processing, step 130. The steps of updating the outbound call lists 34 and creating/maintaining the call record index table 32 and call record update tables 38 are preferably performed by scripts, as described above, that are invoked at a predetermined date and time, for example, at the end of each day.

Figure 4:
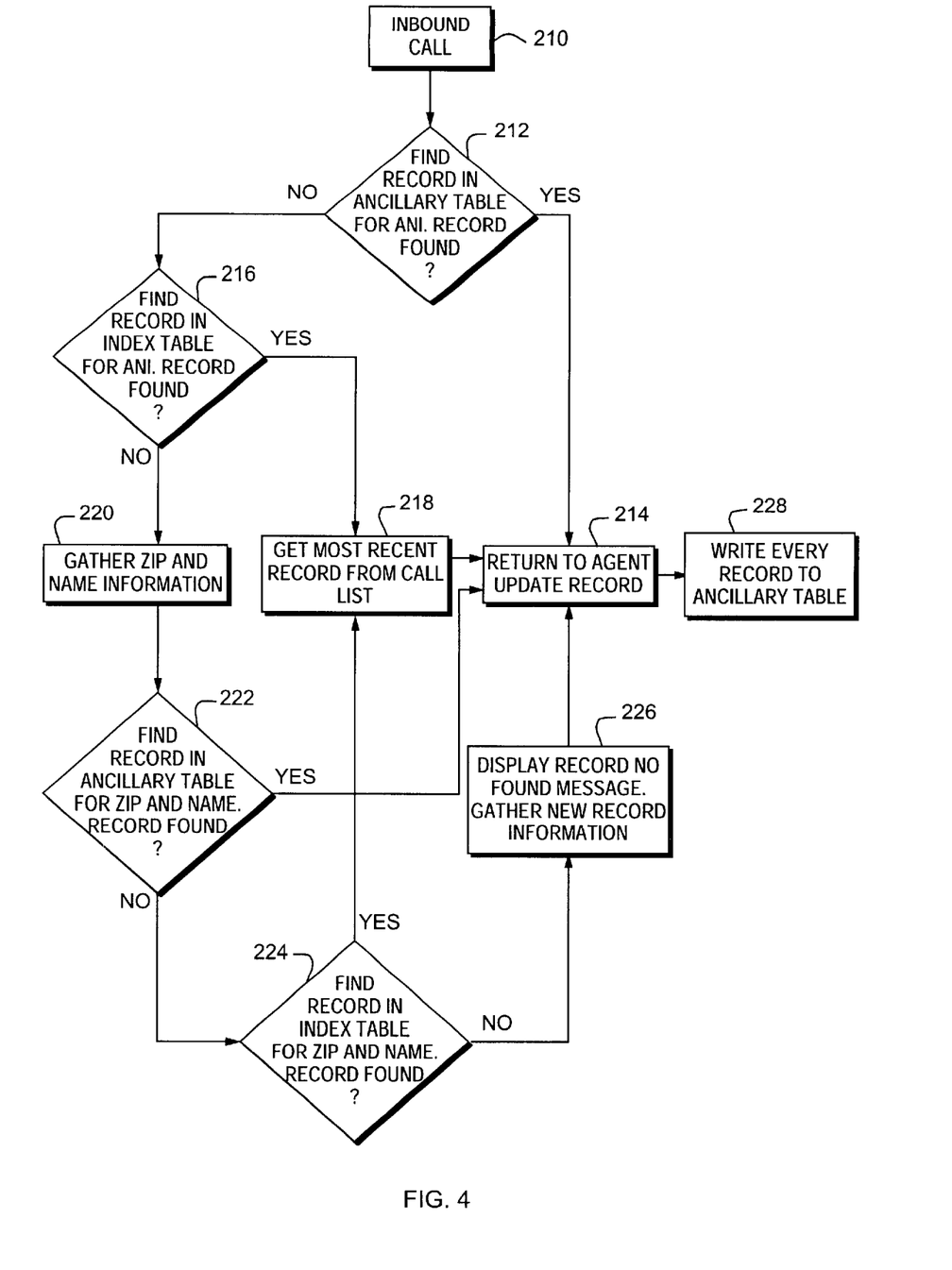
FIG. 4 is a flow chart of a method of searching for a matching outbound call record for use with an inbound telephone call, according the preferred method of the present invention.

Referring to FIG. 4, the preferred method of processing inbound telephone calls with outbound call records begins by receiving an inbound telephone call, step 210, together with an automatically identified telephone number, for example, using Automatic Number Identification (ANI). The appropriate updated call record table 38 is first searched for an updated call record having a telephone number matching the automatically identified telephone number, step 212. If a matching call record having a matching telephone number is found, the matching call record is transmitted to an agent terminal for use in processing the inbound call and updating the call record accordingly, step 214. Using the automatically identified telephone number to search for the matching call records, allows the searching to be performed automatically and invisible to the agent, allowing the agent to perform other tasks while the matching call record is found.

If an updated call record having a matching telephone number is not found in the call record update table, the call record index table 32 is searched for an indexed call record having key field data that matches the telephone number, step 216. If an indexed call record having the telephone number is found in the call record index table, the most recent call record corresponding to that indexed call record is retrieved from the appropriate call list 34, step 218, and the call record is transferred to the agent, step 214.

If no call records are found with a matching telephone number, other information, such as the zip code and name of the calling party, are obtained from the calling party, step 220, upon request by an agent or a VRU. The requested information is used to search for an updated call record in the appropriate call record update table 38 having information that matches the requested information, step 222. If a matching updated call record with matching information is found in the call record update table, the matching call record is transferred to the agent and updated accordingly, step 214, as a result of the inbound call. If an updated call record with matching information is not found, the call record index table 32 is searched for an indexed call record having key field data matching the requested information, step 224. If a matching indexed record is found, the corresponding call record is retrieved from the call list, step 218, and transferred to the agent, step 214.

If no matching call record is found, in either the updated call record table or the call record index table, the agent is notified that no message was found, step 226, for example, by displaying the message "NO FOUND MESSAGE" on the display of the agent's terminal. The agent will then generate a new call record, step 214, as a result of the inbound call. The updated call records and new call records generated by the agent are stored in the appropriate call record update table 38, step 228, as described above.

Accordingly, the inbound/outbound call record processing system and method of the present invention allows call records in outbound call lists to be accessed and used for inbound telephone calls. The inbound/outbound call record processing system and method efficiently and automatically retrieves matching call records (if any) from the outbound call lists and provides the call records to an available agent, thereby minimizing the time that the calling party must wait and possibly preventing unnecessary questions from being asked by the agent. Furthermore, the inbound/outbound call record processing system and method updates the call records in an outbound call list with any changes that have been made as a result of inbound telephone calls and prevents redundant outbound telephone calls from being made after an inbound call is received.

Modifications and substitutions by one of ordinary skill in the art are considered to be within the scope of the present invention which is not to be limited except by the claims which follow.

What is claimed is:

1. An inbound/outbound call record processing system, for processing call records for use with both inbound telephone calls and outbound telephone calls in a telephone call center, said system comprising:
    at least one outbound call list including a plurality of call records, wherein each of said plurality of call records includes a record identifier and a plurality of data fields;
    a call record index table including a plurality of indexed call records corresponding to said plurality of call records in said at least one outbound call list, wherein each of said plurality of indexed call records includes a record identifier corresponding to said record identifier of one of said plurality of call records in said at least one outbound call list and includes at least one searchable key field;
    a call record finder, responsive to at least one inbound telephone call from a calling party, for receiving identification data associated with said calling party, for searching at least said call record index table for key field data matching said identification data, for obtaining a record identifier of a matching call record having said key field data matching said identification data, and for retrieving said matching call record from said outbound call list; and
    a call record index table creator/updater, for creating said call record index table based on said at least one outbound call list, and for updating said call record index table based on changes to said at least one outbound call list.

2. The system of claim 1 wherein said identification data includes an automatically identified telephone number of said calling party, and wherein said searchable key fields of each of said plurality of indexed call records includes a telephone number.

3. The system of claim 1 wherein said identification data includes requested information provided by said calling party.

4. The system of claim 3 wherein said requested information provided by said calling party is selected from a group consisting of: a name, a zip code, and an account number.

5. The system of claim 1 further including an exclusion list, for listing call records to be excluded from outbound telephone calls, wherein each said matching call record found by said call record finder is placed in said exclusion list.

6. The system of claim 1 further including:
    at least one call record update table, for storing a plurality of updated call records that have been updated as a result of inbound telephone calls; and
    a call record updater, responsive to a completion of said at least one inbound telephone call, for inserting an updated call record into said at least one call record update table.

7. The system of claim 6 wherein said at least one call record update table is searchable by said call record finder.

8. The system of claim 6 further including a call list updater, for updating said outbound call list with said updated call records in said at least one call record update table.

9. An inbound/outbound call record processing system, for processing call records for use with both inbound telephone calls and outbound telephone calls in a telephone call center, said system comprising:
    at least one outbound call list including a plurality of call records, wherein each of said plurality of call records includes a record identifier and a plurality of data fields;
    a call record index table including a plurality of indexed call records corresponding to said plurality of call records in said at least one outbound call list, wherein each of said plurality of indexed call records includes a record identifier corresponding to said record identifier of one of said plurality of call records in said at least one outbound call list and includes at least one searchable key field;
    a call record finder, responsive to at least one inbound telephone call from a calling party, for receiving identification data associated with said calling party, for searching at least said call record index table for a searchable key field matching said identification data, for obtaining a record identifier of a matching call record having said searchable key field matching said identification data, and for retrieving said matching call record from said outbound call list;
    an exclusion list, for listing call records to be excluded from outbound telephone calls, wherein each said matching call record found by said call record finder is placed in said exclusion list;

at least one call record update table, for storing a plurality of updated call records processed for inbound telephone calls;

a call record updater, responsive to a completion of said at least one telephone call, for inserting an updated call record into said at least one call record update table; and a call record index table creator/updater, for creating said call record index table based on said at least one outbound call list, and for updating said call record index table based on changes to said at least one outbound call list.

10. The system of claim 9 wherein said identification data includes at least one of an automatically identified telephone number of said calling party and requested information provided by said calling party.

11. A method for processing call records for use with both inbound telephone calls and outbound telephone calls in a telephone call center, said method comprising the steps of:

providing at least one outbound call list including a plurality of call records, wherein each of said call records in said outbound call list includes a call record identifier and a plurality of data fields;

receiving at least one inbound telephone call from a calling party and identification data associated with said calling party;

locating at least one matching call record having said identification data of said calling party in said at least one outbound call list;

placing said matching call record into an exclusion list of excluded call records, for excluding said matching call record from being used for outbound telephone calls;

transferring said matching call record to an agent terminal assigned to said inbound telephone call and connecting at least a voice portion of said inbound telephone call to said agent, for processing said inbound telephone call and updating said matching call record to generate an updated call record; and inserting said updated call record into at least one call record update table.

12. The method of claim 11 wherein the step of finding said matching call record includes:

searching said call record update table for an updated call record having said identification data.

13. The method of claim 12 wherein, if said matching call record is not found in said call record update table, the step of finding said matching call record further includes:

searching a call record index table for an indexed call record having key field data that matches said identification data, wherein said indexed call record having said key field data that matches said identification data includes a record identifier corresponding to said record identifier of one of said plurality of call records in said at least one outbound call list; and retrieving said matching call record having said corresponding record identifier found in said call record index table from said at least one outbound call list.

14. The method of claim 13 wherein said identification data includes an automatically identified telephone number of said calling party, and wherein said at least one searchable key field of each of said indexed call records in said call record index table includes a telephone number corresponding to said indexed call record.

15. The method of claim 13 wherein said identification data includes requested information provided by said calling party.

16. The method of claim 11 further including the steps of:

creating a new call record when a matching call record is not found; and inserting said new call record in said call record update table.

17. The method of claim 11 further including the steps of:

updating said at least one call record table with said updated call records in said call record update table; and deleting said excluded call records from said exclusion list.

18. The method of claim 16 further including the steps of:

assigning said new call records in said call record update table to a new call record table.

19. A method for processing call records for use with both inbound telephone calls and outbound telephone calls in a telephone call center, said method comprising the steps of:

providing at least one outbound call list including a plurality of call records, wherein each of said plurality of call records in said outbound call list includes a call record identifier and a plurality of data fields;

providing at least one call record index table including indexed call records corresponding to said plurality of call records in said at least one outbound call list, wherein each of said indexed call records includes a record identifier corresponding to said record identifier of one of said call records in said at least one outbound call list and at least one searchable key field;

providing at least one call record update table, for storing updated call records;

receiving an inbound telephone call from a calling party and identification data associated with said calling party;

finding a matching call record having said identification data of said calling party, wherein finding said matching call record includes one of the following steps:

searching said at least one call record update table for an updated call record having said identification data of said calling party; and searching said call record index table for an indexed call record having a searchable key field that matches said identification data of said calling party, and retrieving, from said at least one outbound call list, said matching call record having a record identifier that matches a record identifier of said indexed call record having a searchable key field that matches said identification data of said calling party;

placing said matching call record into an exclusion list of excluded call records, for excluding said matching call record from being used for outbound telephone calls;

transferring said matching call record to an agent terminal assigned to said inbound telephone call, for processing said inbound telephone call and for updating said matching call record to generate an updated call record; and inserting said updated call record into at least one call record update table.

20. The method of claim 19 further including the steps of:

creating a new call record when processing said inbound telephone call when a matching call record is not found; and inserting said new call record in said ancillary call record table.

21. The method of claim 19 wherein said identification data includes an automatically identified telephone number of said calling party.

22. The method of claim 21 wherein said identification data includes requested information provided by said calling party, and wherein the steps of searching said at least one call record update table and searching said call record index table are first performed using said automatically identified telephone number and then performed using said requested information.

23. The method of claim 19 further including the steps of:
updating said at least one call record table with said updated call records in said call record update table; and
deleting said excluded call records from said exclusion list.

24. The method of claim 20 further including the steps of:
assigning said new call records in said call record update table to a new call record table.

25. A method for processing call records for use with both inbound telephone calls and outbound telephone calls in a telephone-call center, said method comprising the steps of:
providing at least one outbound call list including a plurality of call records, wherein each of said plurality of call records in said outbound call list includes a call record identifier and a plurality of data fields;
providing at least one call record index table including indexed call records corresponding to said plurality of call records in said at least one outbound call list, wherein each of said indexed call records includes a record identifier corresponding to said record identifier of one of said call records in said at least one outbound call list and at least one searchable key field including a telephone number;
providing at least one call record update table, for storing updated call records;
receiving an inbound telephone call from a calling party;
automatically identifying a telephone number of said calling party;
searching said at least one call record update table for an updated call record having said telephone number of said calling party;
if an updated call record having said telephone number is not found, searching said call record index table for an indexed call record having a searchable key field that matches said telephone number of said calling party, and retrieving, from said at least one outbound call list, said matching call record having a record identifier that matches a record identifier of said indexed call record having said telephone number of said calling party;
if an indexed call record having said telephone number is not found, requesting information from said calling party;
searching said at least one call record update table for an updated call record having said requested information of said calling party;
if an updated call record having said requested information is not found, searching said call record index table for an indexed call record having a searchable key field that matches said requested information of said calling party, and retrieving, from said at least one outbound call list, said matching call record having a record identifier that matches a record identifier of said indexed call record having said requested information of said calling party;
placing a matching call record into an exclusion list of excluded call records, for excluding said matching call record from being used for outbound telephone calls;
transferring said matching call record to an agent terminal assigned to said inbound telephone call, for processing said inbound telephone call and for updating said matching call record to generate an updated call record; and
inserting said updated call record into at least one call record update table.

26. A method for processing call records for use with both inbound telephone calls and outbound telephone calls in a telephone call center, said method comprising the steps of:
providing at least one outbound call list including a plurality of call records, wherein each of said plurality of call records in said outbound call list includes a call record identifier and a plurality of data fields;
receiving an inbound telephone call from a calling party;
automatically identifying a telephone number of said calling party;
searching for a matching call record in said outbound call list having said telephone number;
if a matching call record having said telephone number is not found, the steps of:
requesting identification data from said calling party; and searching for a matching call record in said outbound call list having said identification data provided by said calling party;
placing a matching call record into an exclusion list of excluded call records, for excluding said matching call record from being used for outbound telephone calls;
transferring said matching call record to an agent terminal assigned to said inbound telephone call and connecting at least a voice portion of said inbound telephone call to said agent, for processing said inbound telephone call and for updating said matching call record to generate an updated call record; and
inserting said updated call record into at least one call record update table.

* * * * *